(12) United States Patent
Huang et al.

(10) Patent No.: US 7,965,362 B2
(45) Date of Patent: Jun. 21, 2011

(54) LIQUID CRYSTAL PANEL HAVING RECESSES FOR HOLDING SPACERS

(75) Inventors: Hsin-Chieh Huang, Miao-Li (TW); Jia-Yi Wu, Miao-Li (TW); Kun-Hsing Hsiao, Miao-Li (TW)

(73) Assignee: Chimel Innolux Corporation, Miao-Li County (TW)

( * ) Notice: Subject to any disclaimer, the term of this patent is extended or adjusted under 35 U.S.C. 154(b) by 134 days.

(21) Appl. No.: 12/215,831

(22) Filed: Jun. 30, 2008

(65) Prior Publication Data

US 2009/0002610 A1  Jan. 1, 2009

(30) Foreign Application Priority Data

Jun. 29, 2007  (CN) .......................... 2007 1 0076262

(51) Int. Cl.
*G02F 1/1333* (2006.01)
*G02F 1/1343* (2006.01)
(52) U.S. Cl. ........................... 349/138; 349/139
(58) Field of Classification Search .................. 349/138, 349/139
See application file for complete search history.

(56) References Cited

U.S. PATENT DOCUMENTS

| 4,640,584 | A  | * | 2/1987  | Tsubakimoto et al. | 349/153 |
| 4,712,873 | A  | * | 12/1987 | Kanbe et al.       | 349/102 |
| 6,122,031 | A  | * | 9/2000  | Terada et al.      | 349/155 |
| 6,654,084 | B1 | * | 11/2003 | Marukawa et al.    | 349/110 |
| 6,788,378 | B2 |   | 9/2004  | Yi                 |         |
| 7,385,666 | B2 |   | 6/2008  | Ashizawa et al.    |         |
| 7,557,893 | B2 | * | 7/2009  | Kim et al.         | 349/155 |
| 2004/0109125 | A1 | * | 6/2004 | Choi              | 349/155 |
| 2004/0114090 | A1 |   | 6/2004 | Washizawa et al.  |         |
| 2005/0243247 | A1 | * | 11/2005 | Ryu              | 349/106 |
| 2006/0152667 | A1 | * | 7/2006 | Jeon et al.       | 349/155 |
| 2006/0181667 | A1 | * | 8/2006 | Doi et al.        | 349/155 |
| 2006/0290877 | A1 | * | 12/2006 | Jeon et al.      | 349/187 |
| 2007/0024799 | A1 | * | 2/2007 | Kira et al.       | 349/156 |
| 2007/0139604 | A1 | * | 6/2007 | Paik et al.       | 349/156 |
| 2007/0146618 | A1 |   | 6/2007 | Hashimoto         |         |
| 2008/0003380 | A1 | * | 1/2008 | Kim et al.        | 428/1.1 |

FOREIGN PATENT DOCUMENTS

| CN | 1499267 A     |   | 5/2004  |
| CN | 1611996 A     |   | 5/2005  |
| KR | 2005114141 A  | * | 12/2005 |

* cited by examiner

*Primary Examiner* — K. Cyrus Kianni
(74) *Attorney, Agent, or Firm* — Wei Te Chung

(57) ABSTRACT

An exemplary liquid crystal panel (1) includes a first substrate assembly (110), a second substrate assembly (120) generally opposite to the first substrate assembly, a liquid crystal layer (130) sandwiched between the two substrate assemblies, and spacers (140) spacing the two substrate assemblies. An area of the liquid crystal panel corresponding to the black matrix is defined as a non-display region. The non-display region defines recesses (129). Ends of the spacers are arranged in the recesses.

6 Claims, 8 Drawing Sheets

LIQUID CRYSTAL PANEL HAVING RECESSES FOR HOLDING SPACERS

CROSS-REFERENCE TO RELATED APPLICATION

This application is related to, and claims the benefit of, a foreign priority application filed in China as Serial No. 200710076262.6 on Jun. 29, 2007. The related application is incorporated herein by reference.

FIELD OF THE INVENTION

The present invention relates to a liquid crystal panel, and particularly to a liquid crystal panel including a plurality of recesses for receiving spacers.

GENERAL BACKGROUND

Liquid crystal displays are commonly used as display devices for compact electronic apparatuses, because they provide good quality images and are very thin. A major component of a typical liquid crystal display is a liquid crystal panel.

Referring to FIG. 13, a typical liquid crystal panel 13 includes a first substrate assembly 910, a second substrate assembly 920 generally opposite to the first substrate assembly 910, a liquid crystal layer 930 sandwiched between the two substrate assemblies 910, 920, and a plurality of spacers 940 spacing the first substrate assembly 910 and the second substrate assembly 920. The liquid crystal layer 930 includes a plurality of liquid crystal molecules 931.

Referring also to FIG. 14, the second substrate assembly 920 includes a second transparent substrate 921, a plurality of gate lines 922 that are parallel to each other and that each extend along a first direction, and a plurality of data lines 923 that are parallel to each other and that each extend along a second direction orthogonal to the first direction. The gate lines 922 and the data lines 923 cross each other, thereby defining a plurality of pixel regions 925. Each pixel region 925 includes a thin film transistor (TFT) 926 disposed in the vicinity of the intersection of the data line 923 and the gate line 922, and a pixel electrode 927.

The first substrate assembly 910 includes a first transparent substrate 911, and a color filter 918 disposed on an inner surface of the first transparent substrate 911. The color filter 918 includes a plurality of red filter units 914, a plurality of green filter units 915, a plurality of blue filter units 916, and a black matrix 917 separating the filter units 914, 915, 916. The filter units 914, 915, 916 are arrayed in a predetermined pattern, and are spaced from each other by the black matrix 917 to avoid color mixing.

The black matrix 917 corresponds to the gate lines 922, the data lines 923, and the TFTs 926. An area of the liquid crystal panel 13 corresponding to the black matrix 917 is defined as a non-display region because the black matrix 917 can absorb incident light. The filter units 914, 915, 916 correspond to the pixel electrodes 927. An area of the liquid crystal panel 13 corresponding to the filter units 914, 915, 916 is defined as a display region.

The spacers 940 are distributed in both the non-display region and the display region. Surfaces of the spacers 940 may affect the alignment of the liquid crystal molecules 931 in the display region, thereby impairing the display performance of the liquid crystal panel 13. Furthermore, the spacers 940 in the display region may move and gather together preventing light from transmitting through the display region. In addition, the pitch between the two substrate assemblies 910, 920 may not be uniform, further impairing the display performance of the liquid crystal panel 13.

Therefore, a liquid crystal panel that can overcome the above-described deficiencies is desired.

SUMMARY

In one preferred embodiment, a liquid crystal panel includes a first substrate assembly, a second substrate assembly generally opposite to the first substrate assembly, a liquid crystal layer sandwiched between the two substrate assemblies, and a plurality of spacers spacing the two substrate assemblies. An area of the liquid crystal panel corresponding to the black matrix is defined as a non-display region. The non-display region defines a plurality of recesses. Ends of the spacers are arranged in the recesses.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views.

DETAILED DESCRIPTION OF PREFERRED EMBODIMENTS

Reference will now be made to the drawings to describe preferred and exemplary embodiments of the present invention in detail.

Figure 1:
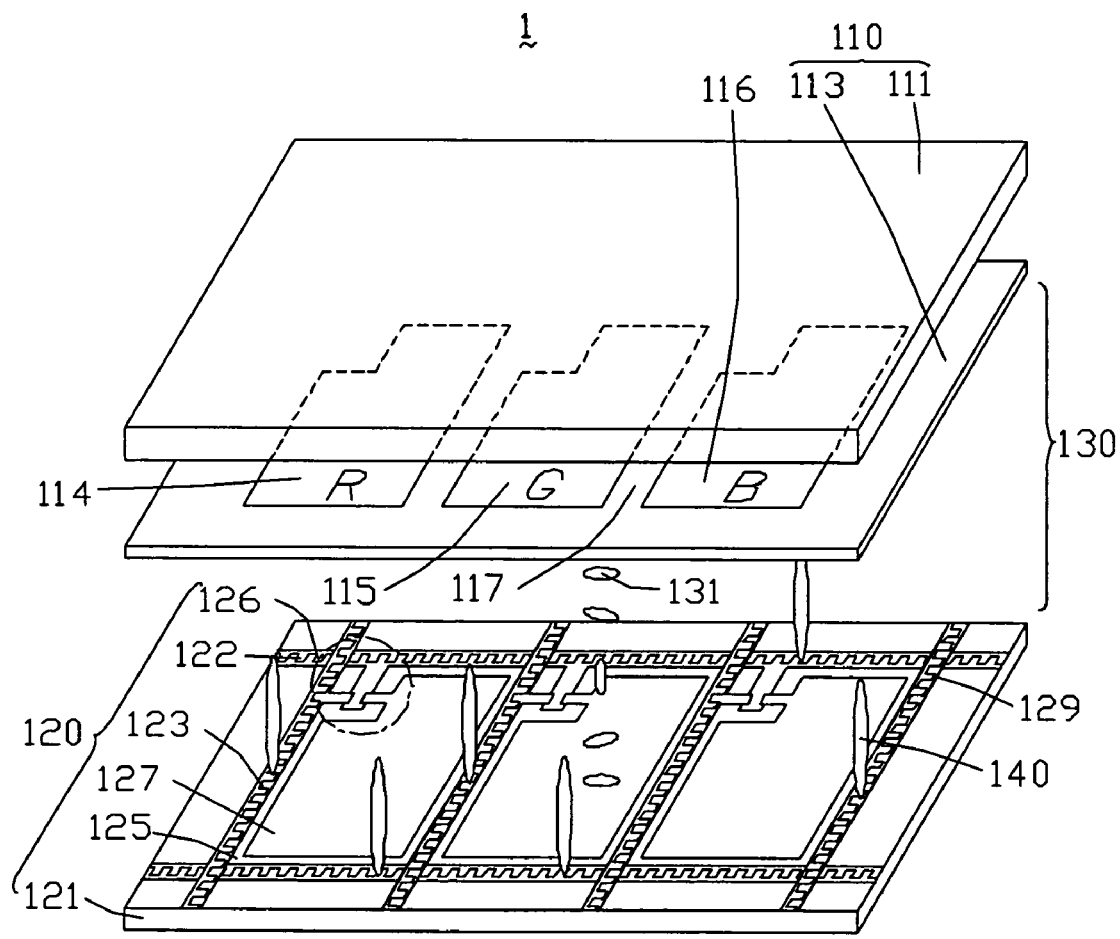
FIG. 1 is an exploded, isometric view of a liquid crystal panel according to a first embodiment of the present invention, the liquid crystal panel including a second substrate assembly having a plurality of recesses.

Referring to FIG. 1, a liquid crystal panel 1 according to a first embodiment of the present invention is shown. The liquid crystal panel 1 includes a first substrate assembly 110, a second substrate assembly 120 generally opposite to the first substrate assembly 110, a liquid crystal layer 130 sandwiched between the two substrate assemblies 110, 120, and a plurality of spacers 140 spacing the two substrate assemblies 110, 120. The liquid crystal layer 130 includes a plurality of liquid crystal molecules 131.

The first substrate assembly 110 includes a first transparent substrate 111, and a color filter 113 disposed on an inner surface of the first transparent substrate 111 that is adjacent to the liquid crystal layer 130. The color filter 113 includes a plurality of red filter units 114, a plurality of green filter units 115, a plurality of blue filter units 116, and a black matrix 117. The filter units 114, 115, 116 are arrayed in a predetermined pattern, and are spaced from each other by the black matrix 117 to avoid color mixing. An area of the liquid crystal panel 1 corresponding to the black matrix 117 is defined as a non-display region because the black matrix 117 can absorb incident light. An area of the liquid crystal panel 1 corresponding to the filter units 114, 115, 116 is defined as a display region.

The second substrate assembly 120 includes a second transparent substrate 121, a plurality of gate lines 122 that are parallel to each other and that each extend along a first direction, and a plurality of data lines 123 that are parallel to each other and that each extend along a second direction that is orthogonal to the first direction. The gate lines 122 and the data lines 123 cross each other, thereby defining a plurality of pixel regions 125. Each pixel region 125 includes a thin film transistor 126 (TFT) disposed in vicinity of the intersection of the data line 123 and the gate line 122, and a pixel electrode 127.

The gate lines 122 and the data lines 123 correspond to the black matrix 117. The pixel electrodes 127 correspond to the filter units 114, 115, 116. The gate lines 122 and the data lines 123 each include a plurality of patterned recesses 129 formed thereon. The recesses 129 are made typically by etching the gate lines 122 and the data lines 123. Ends of the spacers 140 are located in the recesses 129.

Figure 2:
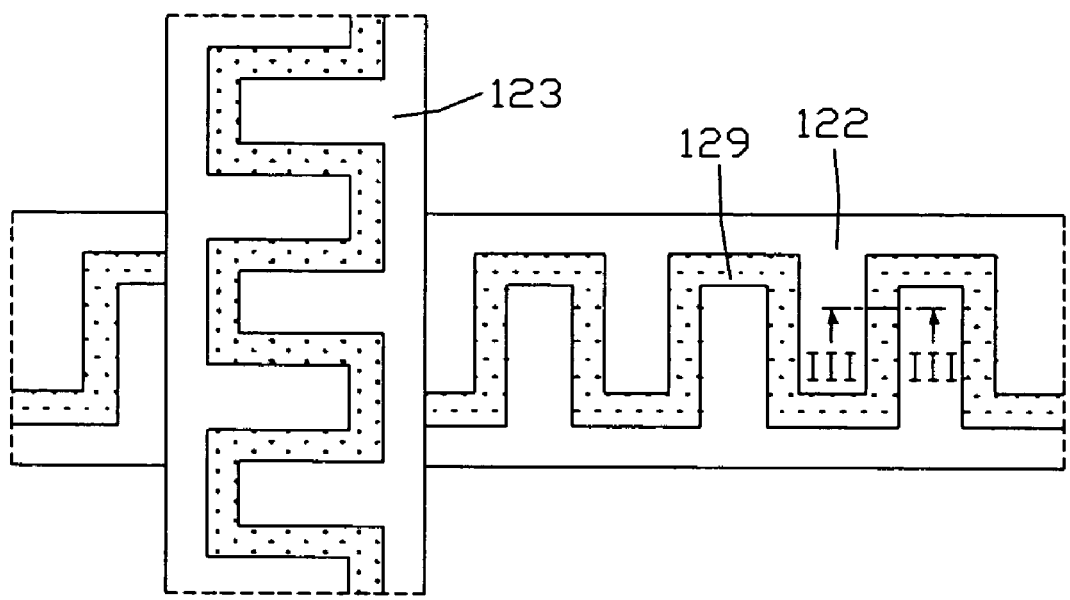
FIG. 2 is an enlarged, plan view of part of the recesses of FIG. 1.
Figure 3:
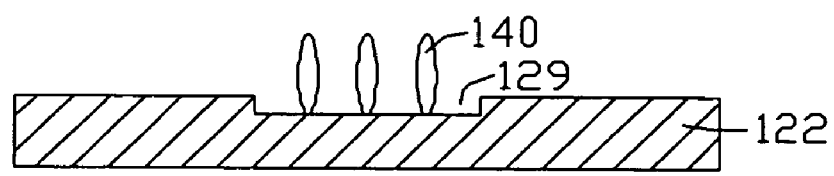
FIG. 3 is an enlarged, cross-sectional view taken along line III-III of FIG. 2.

Referring also to FIGS. 2 and 3, the recesses 129 are substantially continuously square-wave-patterned and have an essentially rectangular cross-sectional configuration. In another aspect, each of the recesses 129 can be considered to be generally concertina-like in shape. The spacers 140 are sprayed in the recesses 129 by a spacer-sprayer (not shown). The spacers 140 are arrayed in the recesses 129 in an orderly fashion and movement is limited by the recesses 129 such that the spacers 140 cannot move into the display region.

The spacers 140 are typically micro-balls made from melamine, urea, or benzoquanamine. In the illustrated embodiment, the spacers 140 are elongate. The black matrix 117 is generally made from a light-sensitive black resin.

In contrast to conventional liquid crystal panels, the gate lines 122 and the data lines 123 of the liquid crystal panel 1 have a plurality of recesses 129 that restrict the spacers 140 to the non-display region. Therefore, the spacers 140 cannot affect the alignment of the liquid crystal molecules 131 in the display region, preventing the display performance of the liquid crystal panel 1 from being impaired. In addition, the display performance of the liquid crystal panel 1 is further improved because the spacers 140 cannot flow together to prevent the transmission of light, and the pitch between the two substrate assemblies 110, 120 is maintained at an essentially constant value.

Figure 4:
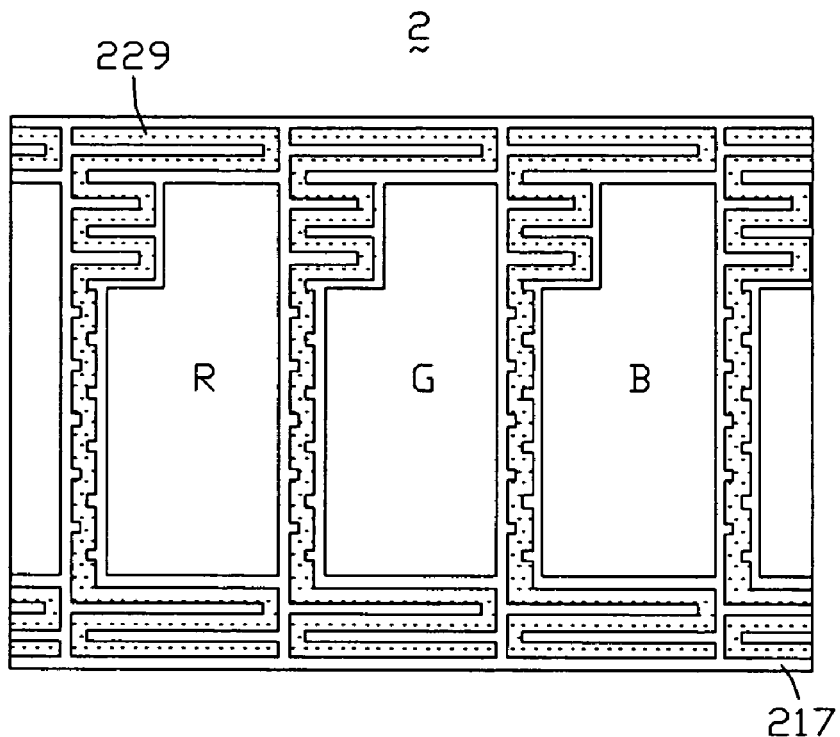
FIG. 4 is a schematic, plan view of a color filter of a liquid crystal panel according to a second embodiment of the present invention.

Referring to FIG. 4, a liquid crystal panel 2 according to a second embodiment of the present invention is similar to the liquid crystal panel 1 in FIG. 1, except that the black matrix 217 includes a plurality of recesses 229 formed thereon. The recesses 229 are substantially continuously square-wave-patterned and have an essentially rectangular cross-sectional configuration. The liquid crystal panel 2 can achieve advantages similar to those of the liquid crystal panel 1.

Figure 5:
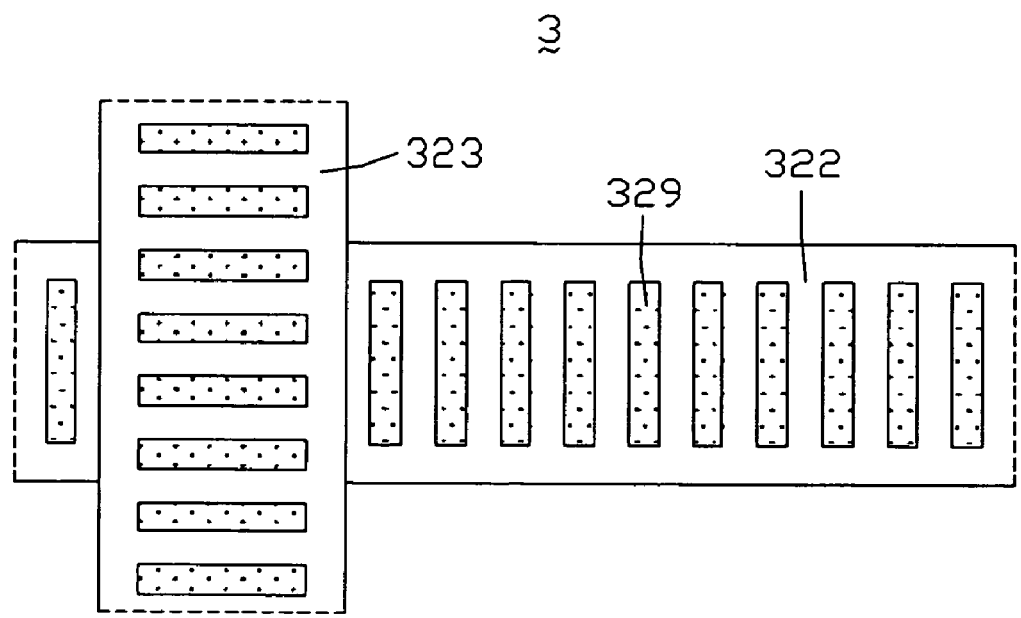
FIG. 5 is a schematic, plan view of gate lines and data lines of a liquid crystal panel according to a third embodiment of the present invention.

Referring to FIG. 5, a liquid crystal panel 3 according to a third embodiment of the present invention is similar to the liquid crystal panel 1 in FIG. 1. A plurality of recesses 329 formed on gate lines 322 and data lines 323 are line-patterned and parallel to each other. The liquid crystal panel 3 can achieve advantages similar to those of the liquid crystal panel 1.

Figure 6:
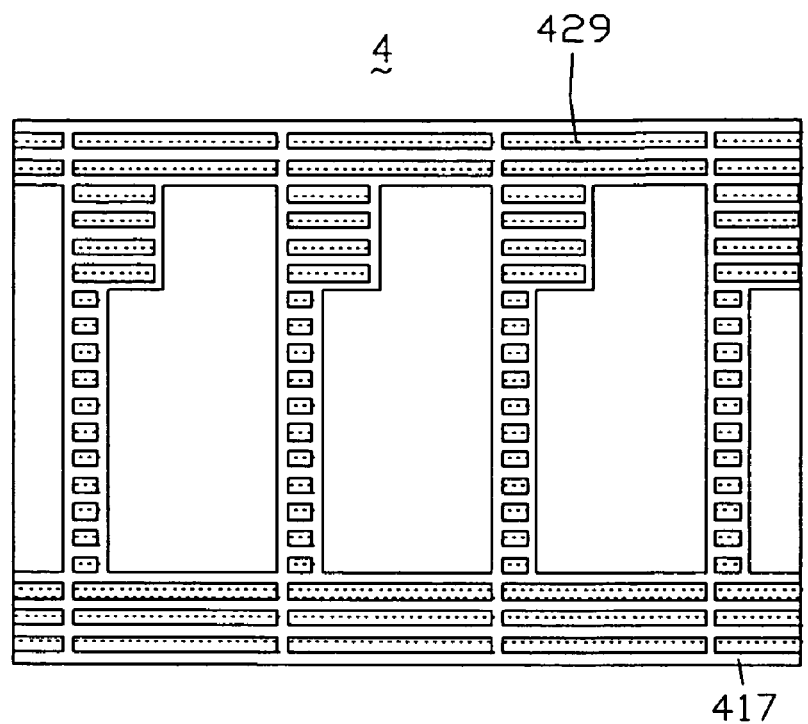
FIG. 6 is a schematic, plan view of a color filter of a liquid crystal panel according to a fourth embodiment of the present invention.

Referring to FIG. 6, a liquid crystal panel 4 according to a fourth embodiment of the present invention is similar to the liquid crystal panel 2 in FIG. 4. A plurality of recesses 429 formed on a black matrix 417 are line-patterned and are parallel to each other. The liquid crystal panel 4 can achieve advantages similar to those of the liquid crystal panel 2.

Figure 7:
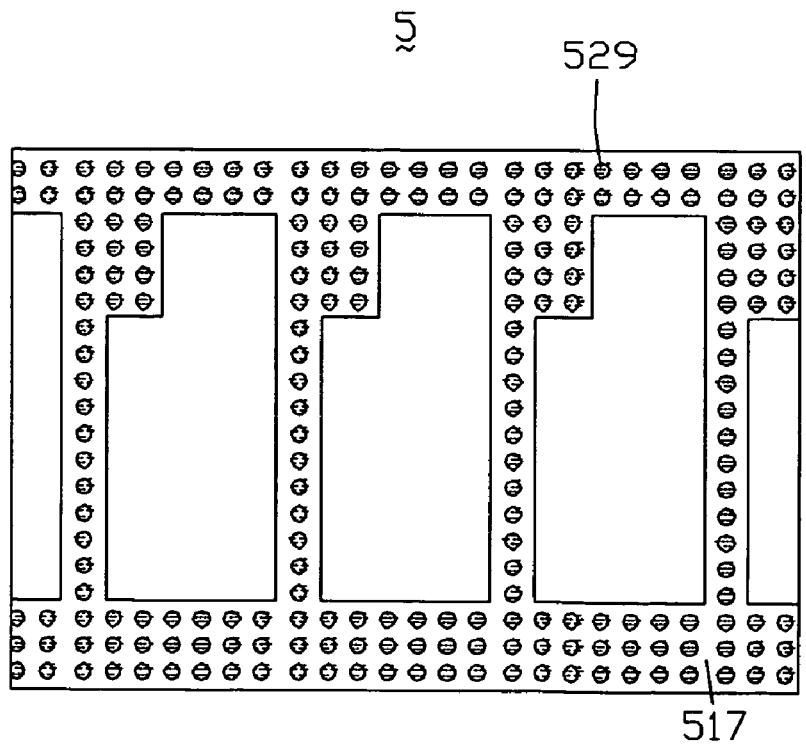
FIG. 7 is a schematic, plan view of a color filter of a liquid crystal panel according to a fifth embodiment of the present invention.

Referring to FIG. 7, a liquid crystal panel 5 according to a fifth embodiment of the present invention is similar to the liquid crystal panel 2 in FIG. 2. A plurality of recesses 529 formed on a black matrix 517 are each circular. The recesses 529 are typically arranged in a predetermined pattern according to need. In the illustrated embodiment, the predetermined pattern is in the form of straight rows and straight columns. The liquid crystal panel 5 can achieve advantages similar to those of the liquid crystal panel 2.

Figure 8:
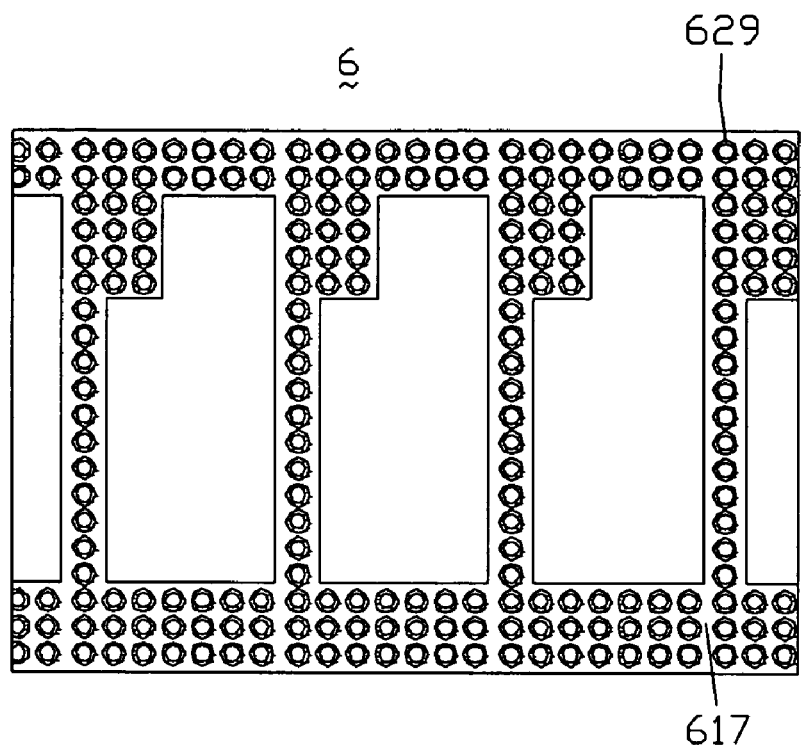
FIG. 8 is a schematic, plan view of a color filter of a liquid crystal panel according to a sixth embodiment of the present invention.

Referring to FIG. 8, a liquid crystal panel 6 according to a sixth embodiment of the present invention is similar to the liquid crystal panel 5 in FIG. 7. A plurality of recesses 629 formed on a black matrix 617 are each annulus-shaped. In one embodiment, a circular portion of the black matrix 617 inside each annulus is recessed (lower, as viewed in FIG. 8) compared to a major surface of the black matrix 617. The recesses 629 are typically arranged in a predetermined pattern according to need. In the illustrated embodiment, the predetermined pattern is in the form of straight rows and straight columns. The liquid crystal panel 6 can achieve advantages similar to those of the liquid crystal panel 5.

Figure 9:
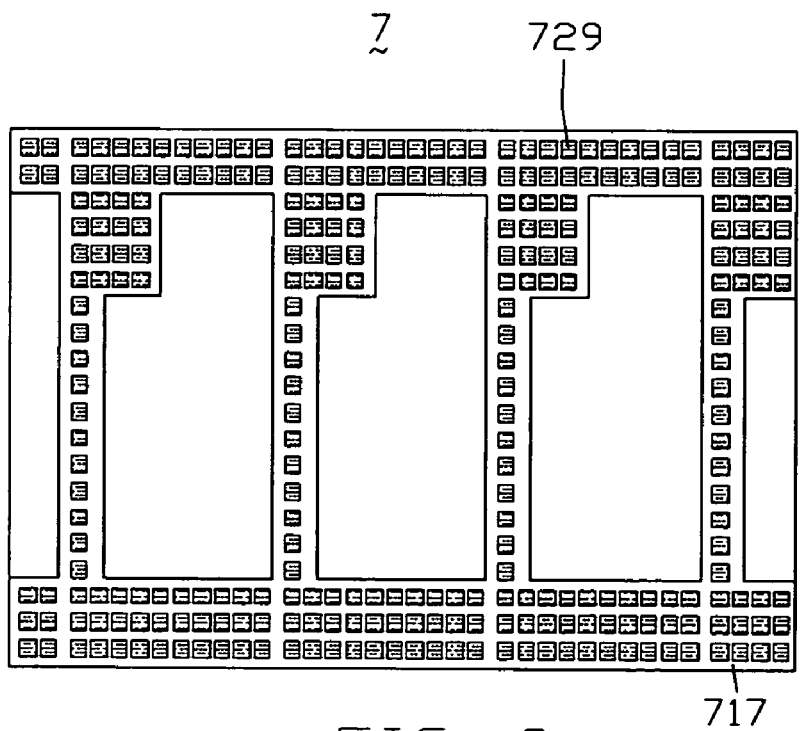
FIG. 9 is a schematic, plan view of a color filter of a liquid crystal panel according to a seventh embodiment of the present invention.

Referring to FIG. 9, a liquid crystal panel 7 according to a seventh embodiment of the present invention is similar to the liquid crystal panel 2 in FIG. 2. A plurality of recesses 729 formed on a black matrix 715 are each rectangular (e.g., square). The recesses 729 are typically arranged in a predetermined pattern according to need. In the illustrated embodiment, the predetermined pattern is in the form of straight rows and straight columns. The liquid crystal panel 7 can achieve advantages similar to those of the liquid crystal panel 2.

Figure 10:
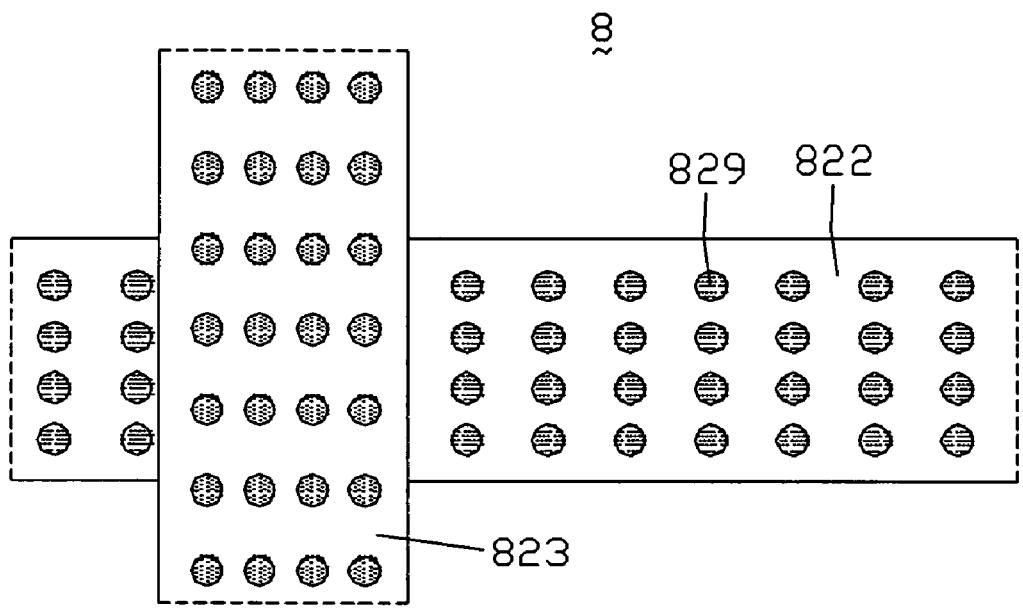
FIG. 10 is a schematic, plan view of gate lines and data lines of a liquid crystal panel according to an eighth embodiment of the present invention.

Referring to FIG. 10, a liquid crystal panel 8 according to an eighth embodiment of the present invention is similar to the liquid crystal panel 1 in FIG. 1. A plurality of recesses 829 formed on gate lines 822 and data lines 823 are each circular. The recesses 829 are typically arranged in a predetermined pattern according to need. In the illustrated embodiment, the predetermined pattern is in the form of spaced rows or spaced columns. The liquid crystal panel 8 can achieve advantages similar to those of the liquid crystal panel 1.

Figure 11:
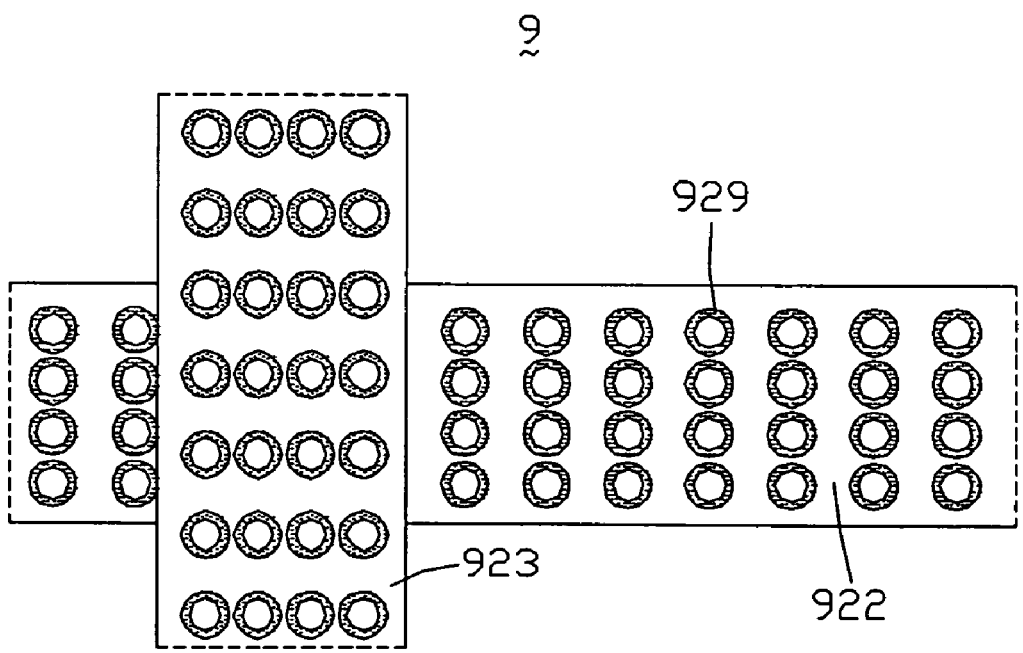
FIG. 11 is a schematic, plan view of gate lines and data lines of a liquid crystal panel according to a ninth embodiment of the present invention.

Referring to FIG. 11, a liquid crystal panel 9 according to a ninth embodiment of the present invention is similar to the liquid crystal panel 8 in FIG. 10. A plurality of recesses 929 formed on gate lines 922 and data lines 923 are each annulus-shaped. In one embodiment, a circular portion of each gate line 922 inside each annulus is recessed (lower, as viewed in FIG. 11) compared to a major surface of the gate line 922. Similarly, a circular portion of each data line 923 inside each annulus is recessed (lower, as viewed in FIG. 11) compared to a major surface of the data line 923. The recesses 929 are typically arranged in a predetermined pattern according to need. In the illustrated embodiment, the predetermined pattern is in the form of spaced rows or spaced columns. The liquid crystal panel 9 can achieve advantages similar to those of the liquid crystal panel 8.

Figure 12:
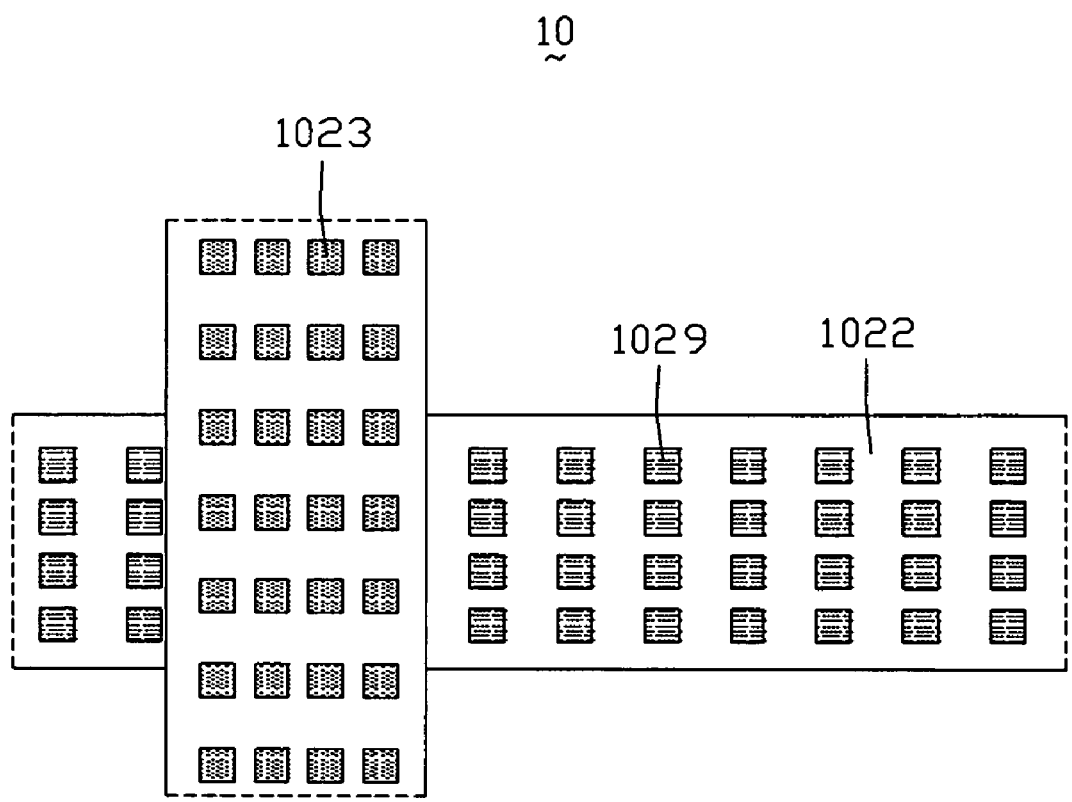
FIG. 12 is a schematic, plan view of gate lines and data lines of a liquid crystal panel according to a tenth embodiment of the present invention.
Figure 13:
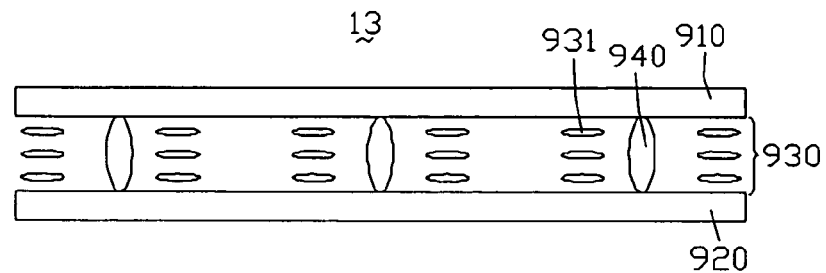
FIG. 13 is a side, cross-sectional view of a typical liquid crystal panel.
Figure 14:
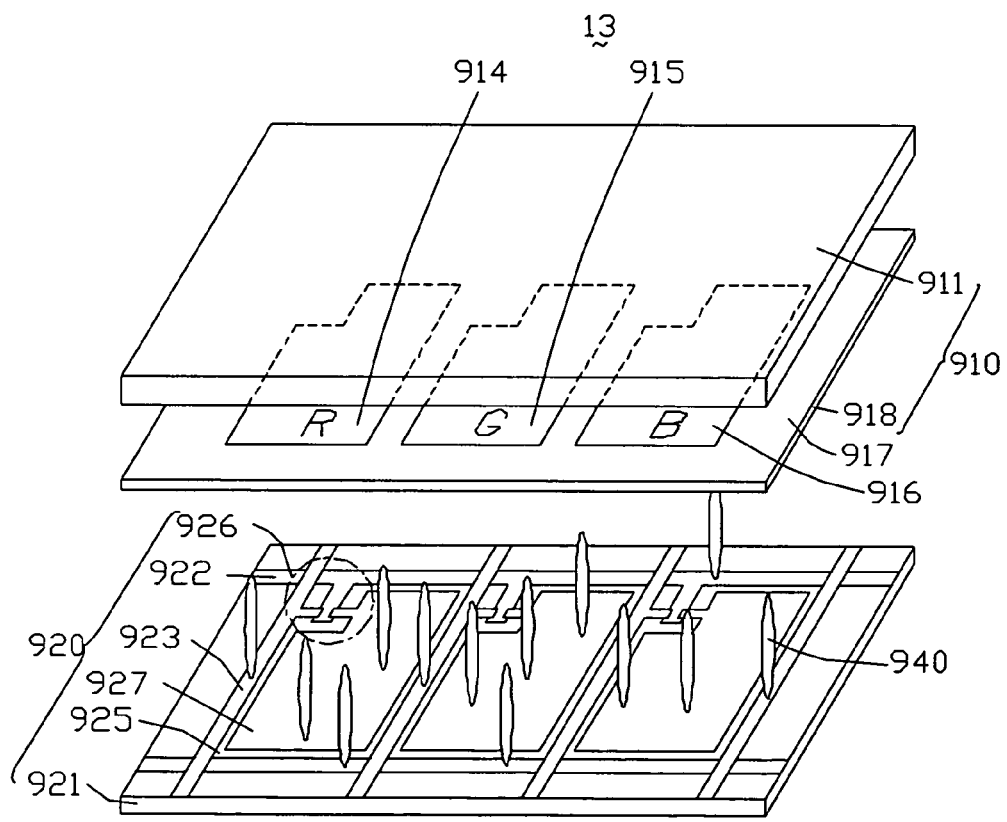
FIG. 14 is an exploded, isometric view of the typical liquid crystal panel of FIG. 13.

Referring to FIG. 12, a liquid crystal panel 10 according to a tenth embodiment of the present invention is similar to the liquid crystal panel 9 in FIG. 11. A plurality of recesses 1029 formed on gate lines 1022 and data lines 1023 are each rectangular (e.g., square). The recesses 1029 are typically arranged in a predetermined pattern according to need. In the illustrated embodiment, the predetermined pattern is in the form of spaced rows or spaced columns. The liquid crystal panel 10 can achieve advantages similar to those of the liquid crystal panel 9.

Further or alternative embodiments may include the following two examples. In one example, a passivation layer is disposed on the gate lines 122 and the data lines 123, and the recesses 129 are made by etching the passivation layer. In another example, the black matrix 117 includes a plurality of first recesses formed thereon, and the gate lines 122 and the data lines 123 include a plurality of second recesses corresponding to the first recesses.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A liquid crystal panel comprising:
    a first substrate assembly comprising a black matrix, an area of the liquid crystal panel corresponding to the black matrix defined as a non-display region of the liquid crystal panel;
    a second substrate assembly parallel to the first substrate assembly, the second substrate assembly comprising a plurality of gate lines parallel to each other and a plurality of data lines parallel to each other and crossing the gate lines, the gate lines and the data lines corresponding to the non-display region of the liquid crystal panel;
    a liquid crystal layer sandwiched between the two substrate assemblies; and
    a plurality of spacers spacing the two substrate assemblies, wherein an inner surface region of the second substrate assembly that is adjacent to the liquid crystal layer has a plurality of recesses defined therein, the recesses are defined in the gate lines and the data lines, and ends of the spacers are arranged in the recesses.

2. The liquid crystal panel of claim 1, wherein the recesses are selected from the group consisting of substantially continuously square-wave-patterned, line-patterned, circular-patterned, annulus-patterned, and rectangular-patterned.

3. The liquid crystal panel of claim 1, wherein the spacers are selected from the group consisting of micro-balls and elongate pieces, and are made from material selected from the group consisting of melamine, urea, and benzoquanamine.

4. A liquid crystal panel comprising:
    a first substrate assembly comprising a black matrix, an area of the liquid crystal panel corresponding to the black matrix defined as a non-display region of the liquid crystal panel;
    a second substrate assembly parallel to the first substrate assembly, the second substrate assembly comprising a plurality of gate lines parallel to each other, a plurality of data lines parallel to each other and crossing the gate lines, and a passivation layer disposed on the gate lines and data lines and adjacent to the liquid crystal layer, the gate lines and the data lines corresponding to the non-display region of the liquid crystal panel;
    a liquid crystal layer sandwiched between the two substrate assemblies; and
    a plurality of spacers spacing the two substrate assemblies, wherein an inner surface region of the second substrate assembly that is adjacent to the liquid crystal layer has a plurality of recesses defined therein, the recesses are defined in the passivation layer at positions corresponding to the non-display region of the liquid crystal panel, and ends of the spacers are arranged in the recesses.

5. The liquid crystal panel of claim 4, wherein the recesses are selected from the group consisting of substantially continuously square-wave-patterned, line-patterned, circular-patterned, annulus-patterned, and rectangular-patterned.

6. The liquid crystal panel of claim 4, wherein the spacers are selected from the group consisting of micro-balls and elongate pieces, and are made from material selected from the group consisting of melamine, urea, and benzoquanamine.

* * * * *